Patented Jan. 17, 1933

1,894,491

UNITED STATES PATENT OFFICE

MAX ALBERT KUNZ, OF MANNHEIM, AND KARL KOEBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

DERIVATIVE OF POLYMERIZED CYANOANTHRAQUINONE COMPOUNDS

No Drawing. Application filed November 12, 1930, Serial No. 495,281, and in Germany November 18, 1929.

The present invention relates to derivatives of polymerized cyanoanthraquinone compounds and process of producing the same.

We have found that new derivatives of polymerized cyanoanthraquinone compounds which are valuable partly as dyestuffs and partly as intermediate products are obtained by treating amino derivatives of polymerized cyanoanthraquinone compounds of the general formula:

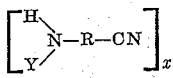

in which $x$ is the number of molecules which are joined together by the polymerization (probably 3), R is an anthraquinone radicle which may contain, besides the amino group indicated, further amino groups or other substituents and Y is hydrogen or an alkyl group, for example a methyl or an ethyl group, with acylating agents. As the polymerized cyanogen compounds are to be understood substances of the kind which are obtainable according to the British Patent Specifications Nos. 309,193 and 309,454 or by treatment of amino derivatives of cyanoanthraquinones with condensing agents, as for example strong acids, such as sulphuric acid, chlorosulphonic acid, phosphoric acid and hydrochloric acid, or alkaline condensing agents.

The reaction may be carried out in the presence or absence of diluents, and of agents for combining with acids. Indifferent aromatic solvents of high boiling point may be employed for the purpose of our invention, for example, nitrobenzene, trichlorobenzene, naphthalene and the like. As acylating agents the halides and anhydrides of organic acids may be used, such as for example the halides and anhydrides of aliphatic acid, such as acetic acid and propionic acid, or aromatic acids, such as benzoic acid, for instance benzoyl chloride, benzo-trichloride, or the said derivatives of naphthoic acid and phthalic acid.

The reaction products are usually obtained in very good yields and in a crystalline form. If desired they may be purified by the usual methods, such as crystallization, sublimation, extraction by means of organic solvents, purification by way of their sulphates, or treatment with oxidizing agents, as for example with sodium hypochlorite.

The following examples will further illustrate the nature of this invention, but the invention is not restricted to these examples. The parts are by weight.

Example 1

750 parts of the polymerization product of 2-amino-3-cyanoanthraquinone (obtainable by heating 2-amino-3-cyanoanthraquinone in quinoline in the presence of copper salts) are heated to boiling in 3250 parts of benzoyl chloride while stirring until the color of the suspension has changed from orange to pure yellow which is usually the case after a few hours. The whole is then allowed to cool and the reaction product which separates in the form of fine yellow needles is filtered off by suction, washed with water or alcohol if desired and dried. It is very difficultly soluble in all organic solvents, crystallizes from 400 to 500 parts of nitrobenzene in the form of yellow needles, dissolves in concentrated sulphuric acid giving an olive-yellow coloration and dyes the vegetable fibre from a brown alkaline hydrosulphite vat powerful clear greenish yellow shades of very good fastness, especially of excellent fastness to kier boiling and bucking and which, contrasted with the orange dyeings of the initial material are quite fast to chlorine.

The reaction may also be carried out in the presence of nitrobenzene or another organic diluent.

Dyestuffs giving lemon yellow and green yellow dyeings are obtained with para-chlorobenzoyl chloride and with metamethoxybenzoyl chloride respectively.

Reaction products which are obtained in an insufficiently pure form may be purified in the form of their aqueous pastes with sodium hypochlorite solution.

The polymerization product of 1-amino-2-cyanoanthraquinone may also be benzoylated in the beforedescribed manner.

*Example 2*

50 parts of the bromination product of the initial material employed in Example 1 (obtained by treatment with bromine in chlorosulphonic acid) are suspended in 300 parts of benzoyl chloride and boiled while stirring until the suspension has become pure yellow in color. The whole is then allowed to cool and is worked up in the manner decribed in Example 1. The reaction product containing bromine obtained forms yellow needles, dissolves in concentrated sulphuric acid giving an olive coloration and dyes cotton from a brown vat yellow shades of very good fastness.

A dyestuff giving yellow dyeings is obtained in an analogous manner by the action of benzoyl chloride on polymerized 1-bromo-2-amino-3-cyanoanthraquinone (obtainable by heating the 1-bromo-2-amino-3-cyanoanthraquinone, obtained by brominating 2-amino-3-cyanoanthraquinone in aqueous suspension, in quinoline with cuprous salts according to the British Patent Specification No. 309,193).

What we claim is:—

1. A process of producing derivatives of polymerized cyanoanthraquinone compounds, which comprises treating an amino derivative of a polymerized cyanoanthraquinone corresponding to the general formula:—

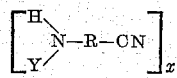

in which $x$ is probably 3, R stands for an anthraquinone radicle, and Y for hydrogen or an alkyl group, with an acylating agent.

2. A process of producing derivatives of polymerized cyanoanthraquinone compounds which comprises treating an amino derivative of a polymerized cyanoanthraquinone corresponding to the general formula:—

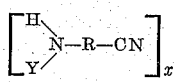

in which $x$ is probably 3, R stands for an anthraquinone radicle, and Y for hydrogen or an alkyl group, with an acylating agent in an indifferent aromatic diluent of high boiling point.

3. As new articles of manufacture derivatives of polymerized cyanoanthraquinone corresponding to the formula:—

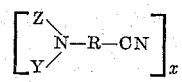

in which $x$ is probably 3, R stands for an anthraquinone radicle, Y for hydrogen or an alkyl group and Z for an acyl group, the said derivatives being difficultly soluble in organic solvents, soluble in concentrated sulphuric acid to give olive colorations and dyeing cotton from brown vats yellow shades.

4. As a new article of manufacture the derivative of polymerized 2-amino-3-cyanoanthraquinone corresponding to the formula:—

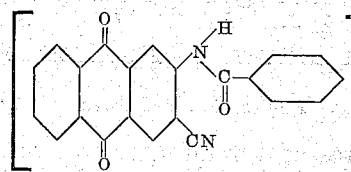

in which $x$ is probably 3, the said derivative forming yellow needles difficultly soluble in organic solvents, dissolving in concentrated sulphuric acid to give an olive yellow coloration and dyeing cotton from a brown vat greenish yellow shades.

5. As a new article of manufacture the derivative of polymerized 2-amino-3-cyanoanthraquinone corresponding to the formula:—

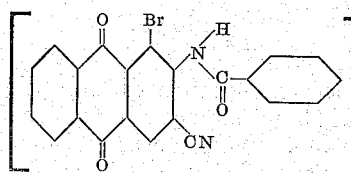

in which $x$ is probably 3, the said derivative forming yellow needles difficultly soluble in organic solvents, dissolving in concentrated sulphuric acid to give an olive coloration and dyeing cotton from a brown vat yellow shades.

6. A process of producing derivatives of polymerized cyanoanthraquinone compounds, which comprises treating an amino derivative of a polymerized cyanoanthraquinone corresponding to the general formula:—

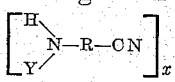

in which $x$ is probably 3, R stands for an anthraquinone radicle which may be substituted by amino or halogen and Y for hydrogen or an alkyl group, with an acylating agent.

7. As new articles of manufacture derivatives of polymerized cyanoanthraquinone corresponding to the formula:

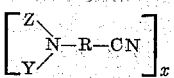

in which $x$ is probably 3, R stands for an anthraquinone radicle which may be substituted by amino or halogen, Y for hydrogen or an alkyl group and Z for an acyl group, the said derivatives being difficultly soluble in organic solvents, soluble in concentrated sulphuric acid to give olive colorations and dyeing cotton from brown vats yellow shades.

8. A process of producing derivatives of polymerized cyanoanthraquinone compounds, which comprises treating an amino derivative of a polymerized cyanoanthraquinone corresponding to the general formula:

in which $x$ is probably 3, R stands for a grouping comprising a single anthraquinone nucleus to which the CN and

groups are directly attached, and Y stands for hydrogen or an alkyl group, with an acylating agent.

9. As new articles of manufacture derivatives of polymerized cyanoanthraquinone corresponding to the formula:

in which $x$ is probably 3, R stands for a grouping comprising a single anthraquinone nucleus to which the CN and

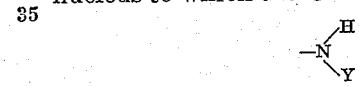

groups are directly attached, Y stands for hydrogen or an alkyl group and Z for an acyl group, the said derivatives being difficultly soluble in organic solvents, soluble in concentrated sulphuric acid to give olive colorations and dyeing cotton yellow shades from brown vats.

In testimony whereof we have hereunto set our hands.

MAX ALBERT KUNZ.
KARL KOEBERLE.